(12) United States Patent
Evans

(10) Patent No.: US 7,634,496 B1
(45) Date of Patent: Dec. 15, 2009

(54) TECHNIQUES FOR MANAGING STATE CHANGES OF A DATA STORAGE SYSTEM UTILIZING THE OBJECT ORIENTED PARADIGM

(75) Inventor: T. David Evans, Rutland, MA (US)

(73) Assignee: EMC Corporation, Hopkinton, MA (US)

( * ) Notice: Subject to any disclaimer, the term of this patent is extended or adjusted under 35 U.S.C. 154(b) by 279 days.

(21) Appl. No.: 11/325,494

(22) Filed: Jan. 3, 2006

(51) Int. Cl.
*G06F 7/00* (2006.01)
(52) U.S. Cl. .......................................... 707/102; 707/6
(58) Field of Classification Search ........................ None
See application file for complete search history.

(56) References Cited

U.S. PATENT DOCUMENTS

| | | | |
|---|---|---|---|
| 5,802,547 A | | 9/1998 | Legvold |
| 6,219,833 B1 * | | 4/2001 | Solomon et al. ............ 717/149 |
| 6,691,113 B1 | | 2/2004 | Harrison et al. |
| 6,938,059 B2 | | 8/2005 | Tamer et al. |
| 7,246,159 B2 | | 7/2007 | Aggarwal et al. |
| 2006/0085492 A1 * | | 4/2006 | Singh et al. ................. 707/203 |
| 2006/0218160 A1 * | | 9/2006 | Bhatia ........................ 707/100 |
| 2007/0083813 A1 * | | 4/2007 | Lui et al. .................... 715/709 |
| 2007/0094310 A1 * | | 4/2007 | Passey et al. ................ 707/204 |

* cited by examiner

*Primary Examiner*—Don Wong
*Assistant Examiner*—Belinda Xue
(74) *Attorney, Agent, or Firm*—BainwoodHuang

(57) ABSTRACT

A technique involves managing state changes of a data storage system in a computerized device configured to obtain object trees representing state information of the data storage system. The technique includes receiving a first object tree which represents the data storage system at a first time, and receiving a second object tree which represents the data storage system at a second time. The second time is after the first time. The technique further includes generating a set of tree comparison results from a comparison between the first object tree representing the data storage system at the first time and the second object tree representing the data storage system at the second time. The set of tree comparison results indicate whether state changes have occurred in the data storage system.

21 Claims, 6 Drawing Sheets

TECHNIQUES FOR MANAGING STATE CHANGES OF A DATA STORAGE SYSTEM UTILIZING THE OBJECT ORIENTED PARADIGM

BACKGROUND

In general, data storage systems perform data storage and retrieval operations on behalf of external host devices. One conventional data storage system includes an array of storage devices and a monitoring device. The monitoring device is configured to operate in the object oriented paradigm, and has (i) a machine state server and (ii) an agent. The machine state server is adapted to output a set of common generic objects representing the array of storage devices in response to a request from the agent. The agent is adapted to objectize the set of common generic objects into a set of specific well-defined objects and, upon request from the external host devices, stream this set of specific well-defined objects to the external host devices. The agent is further adapted to track state changes in the data storage system by objectizing newer sets of common generic objects from the machine state server into newer sets of specific well-defined objects, and then compare each new set of specific well-defined objects with the previous set to determine whether any state changes have occurred in the data storage system (e.g., to detect the addition or removal of a LUN, the occurrence of a data storage operation, etc.).

FIG. 1 is a diagram 20 illustrating the operation of the above-described agent. First, the agent receives a set 22(A) of common generic objects 24 from the machine state server. As shown in FIG. 1, the set 22(A) of common generic objects 24 takes the logical form of a binary tree, and represents a current state of the data storage system. As illustrated by the arrow 26(A) in FIG. 1, the agent then processes the set 22(A) of common generic objects 24 into a subsystem 28(A) of well-defined objects 30. The agent then makes the well-defined objects 30 of this subsystem 28(A) available to the external host devices. For example, when an external host device starts up, the external host device communicates with the agent in order to obtain a stream of the well-defined objects 30 of the subsystem 28(A) and thus obtain a current view (i.e., the state) of the data storage system.

At a later time, the agent requests a new set 22(B) of common generic objects 24 from the machine state server. As with the original set 22(A) of common generic objects 24, this new set 22(B) of common generic objects 24 takes the logical form of a binary tree, and represents the current state of the data storage system at this later time. As illustrated by the arrow 26(B) in FIG. 1, the agent then processes the new set 22(B) of common generic objects 24 into a new subsystem 28(B) of well-defined objects 30. The agent then makes the well-defined objects 30 of this new subsystem 28(B) available to the external host devices. Furthermore, the agent performs a comparison between the original subsystem 28(A) of well-defined objects 30 and the new subsystem 28(B) of well-defined objects 30 (as illustrated by the box 32 in FIG. 1), and makes the result of this subsystem comparison available to the external host devices. Such processing enables the external host devices to detect state changes in the data storage system based on a comparison of the subsystems 28(A), 28(B). Typically, the agent repeats this process periodically (e.g., every minute) so that the state change information (as defined by (i) the retrieval of new sets 22 of common generic objects 24 and (ii) the comparison of subsystems 28) remains relatively up to date.

SUMMARY

Unfortunately, there are deficiencies to the above-described conventional data storage system which compares subsystems 28 of well-defined objects 30 to ascertain data storage system state changes. For example, the comparison of such subsystems 28 requires consumption of a significant amount of computer resources (e.g., processing cycles, memory space, etc.). In particular, the agent must objectize each set 22 of common generic objects 24 into a subsystem 28 of well-defined objects 30, and then store that subsystem 28 in memory. The computer resources (i.e., the processing cycles and memory) required to perform such objectization, and then to store the subsystems 28 for comparison purposes are thus unavailable to perform other work. Furthermore, the agent must then compare the subsystems 28 which is also substantially overhead intensive.

In contrast to the above-described conventional approach to ascertaining state changes in a data storage system by objectizing sets of common generic objects into subsystems of well-defined objects and comparing the subsystems, improved techniques involve a comparison between object trees (e.g., memory constructs logically defined by sets of common generic objects) to identify state changes in a data storage system. Such techniques alleviate the need to (i) objectize sets of common generic objects into subsystems of well-defined objects and then (ii) compare the subsystems. Accordingly, such techniques do not require memory to store multiple subsystems for comparison, and further do not require overhead to objectize the set of common generic objects and then compare resulting subsystems.

One embodiment is directed to a method of managing state changes of a data storage system in a computerized device configured to obtain object trees representing state information of the data storage system. The method includes receiving a first object tree which represents the data storage system at a first time, and receiving a second object tree which represents the data storage system at a second time which is after the first time. The method further includes generating a set of tree comparison results from a comparison between the first object tree representing the data storage system at the first time and the second object tree representing the data storage system at the second time. The set of tree comparison results indicate whether state changes have occurred in the data storage system.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

An improved technique involves a comparison between object trees (e.g., memory constructs which are logically defined by sets of common generic objects) to identify state changes in a data storage system. Such a technique alleviates the need to (i) objectize sets of common generic objects into subsystems of well-defined objects and then (ii) compare the subsystems. Accordingly, such a technique does not require memory to store multiple subsystems for comparison, and further does not require overhead to objectize the set of common generic objects and then compare resulting subsystems.

Figure 1:
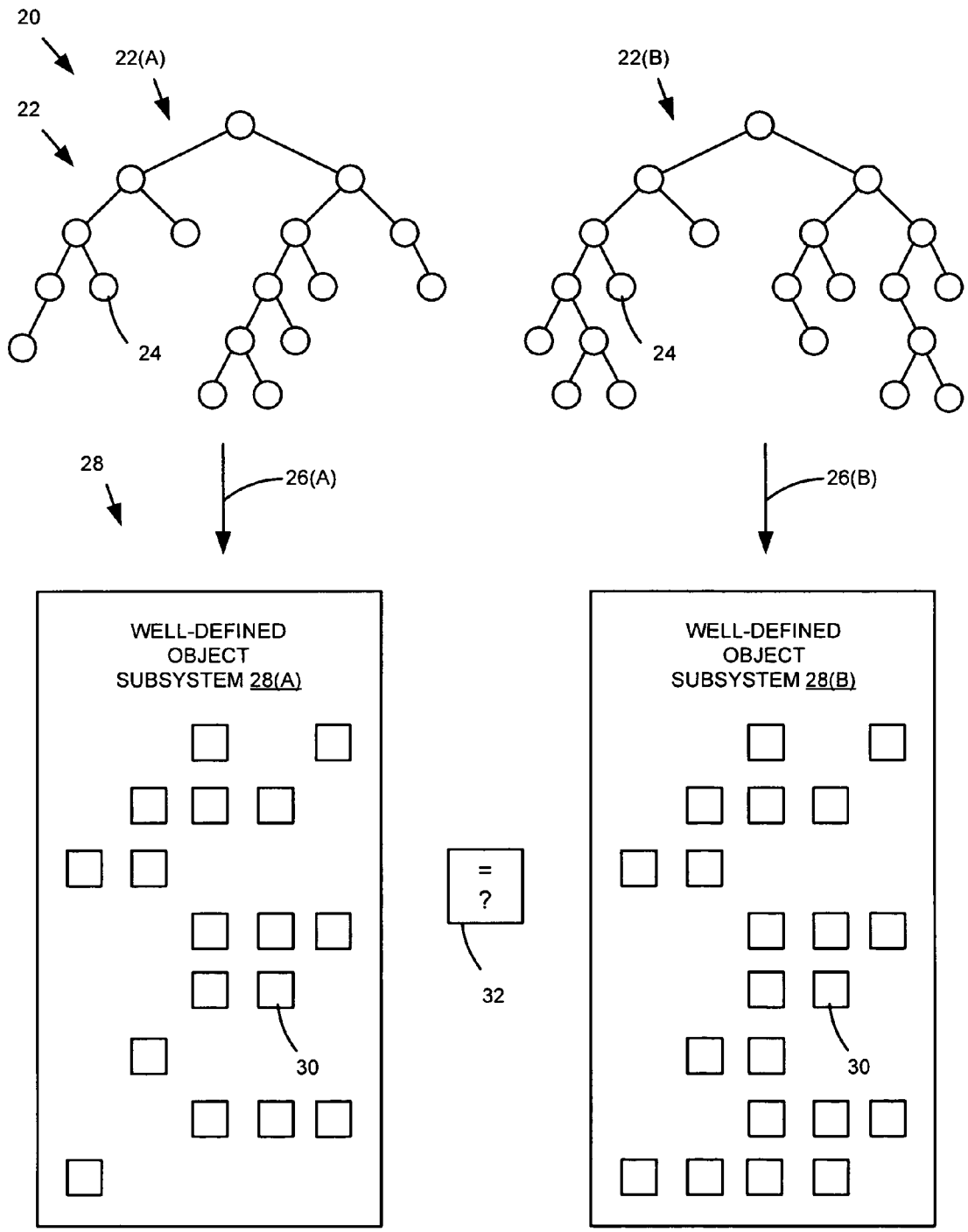
FIG. 1 is a diagram illustrating a conventional approach to tracking state changes in a data storage system.
Figure 2:
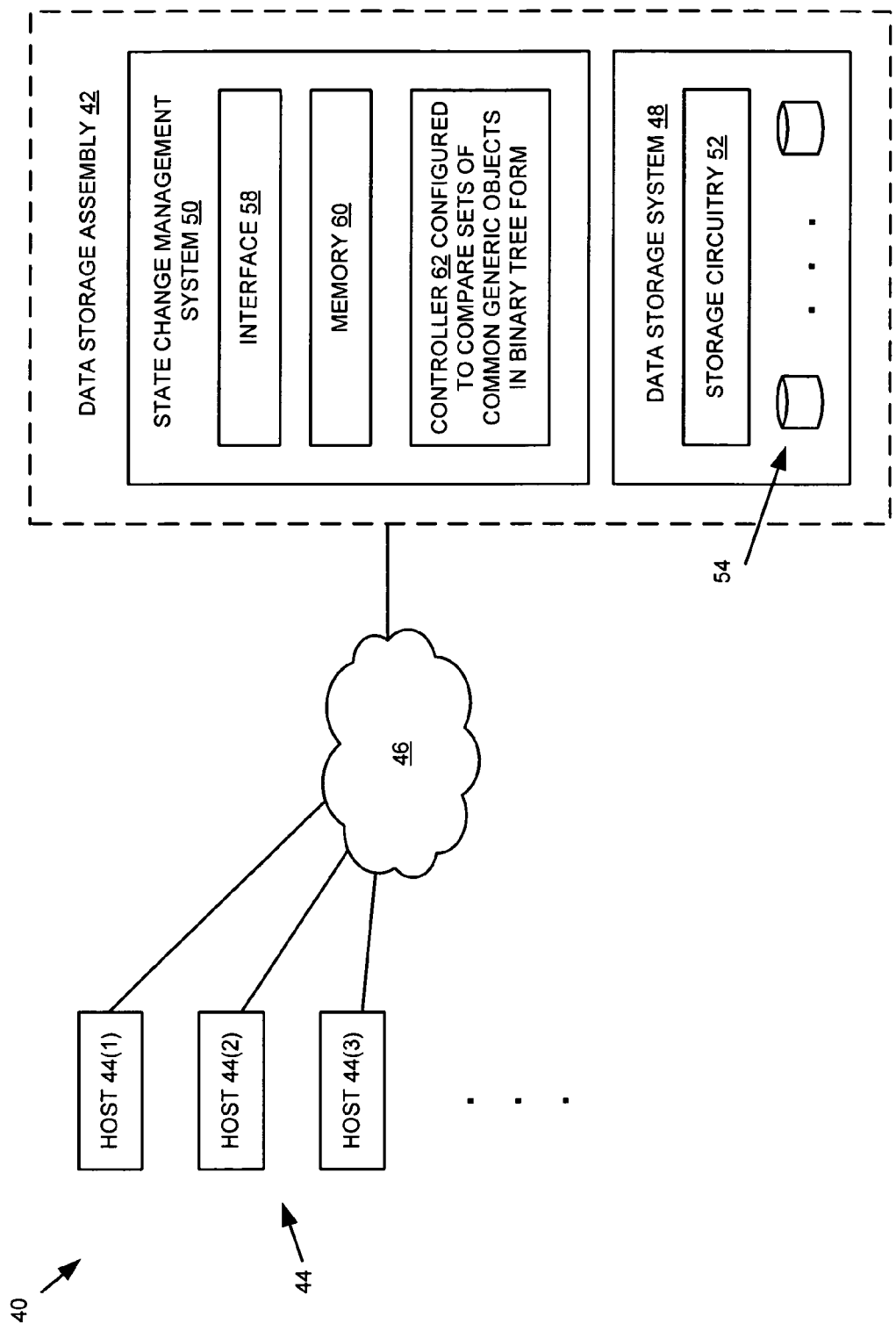
FIG. 2 is a block diagram of a computerized system for managing state change information of a data storage system where state changes are determined by comparing sets of common generic objects.

FIG. 2 is a block diagram of a computerized system 40 which is configured to operate in the object oriented paradigm. The computerized system 40 includes a data storage assembly 42, multiple external hosts 44(1), 44(2), 44(3), . . . (collectively, hosts 44), and a communications medium 46 (e.g., a communications network) that enables the data storage assembly 42 to communicate with the hosts 44.

The data storage assembly 42 is configured to store and retrieve data on behalf of the hosts 44. In particular, the data storage assembly 42 includes a data storage system 48 and a state change management system 50. The data storage system 48 is configured to perform a variety of data storage operations (e.g., read operations, write operations, read-modify-write operations, etc.). The state change management system 50 is configured to manage state change information of the data storage system 48. Although the data storage system 48 and the state change management system 50 are shown adjacent to each other, the data storage system 48 and the state change management system 50 are capable of being separated from each other by a substantial distance (e.g., over a high speed network).

As shown in FIG. 2, the data storage system 48 includes storage circuitry 52 (a set of storage processors) and an array 54 of storage devices 56 (e.g., disk drives). The storage circuitry 52 stores data into and loads data from the array 54 on behalf of the hosts 44 in a traditional manner.

As further shown in FIG. 2, the state change management system 50 includes an interface 58, memory 60 and a controller 62. The interface 58 is configured to allow the passage of information from the memory 60 and the controller 62 to external locations such as to the external hosts 44. The memory 60 is configured to store information for use by the controller 62. The controller 62 is configured to manage state change information of the data storage system 48 by comparing sets of common generic objects in logical binary tree form (e.g., to identify changes in the state of the data storage system 48 and to communicate such changes to the hosts 44). Such a comparison of sets of common generic objects alleviates the need to objectize the sets into subsystems of well-defined objects then compare the subsystems as in conventional approaches. Accordingly, objectization is minimized in the object oriented paradigm. Further details will now be provided with reference to FIG. 3.

Figure 3:
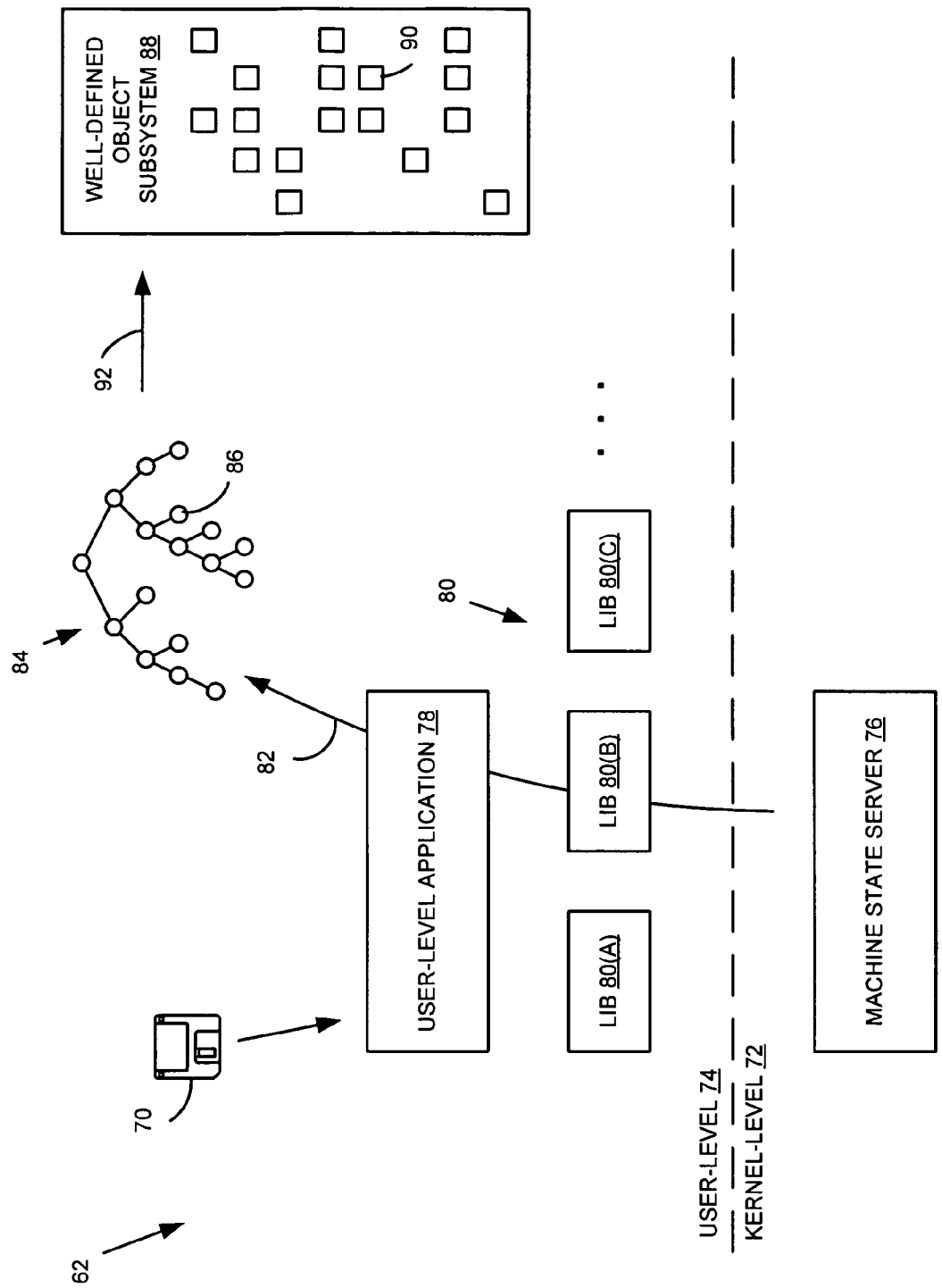
FIG. 3 is a diagram illustrating details of a controller of the computerized system of FIG. 1.

FIG. 3 is a block diagram of an implementation of the controller 62 of the state change management system 50. In some arrangements, the controller 62 is formed by software running on a set of processors. Such software is capable of executing as one or more agents on the same set of processors that perform the store and load operations of the data storage system 48, e.g., a set of storage processors that form the storage circuitry 52 in FIG. 2. Alternatively, such software is capable of executing on processing circuitry which is separate from the storage circuitry 52 in FIG. 2. In either situation, such software is capable of being delivered to the data storage assembly 42 in a variety of ways including installation from a computer program product 70. The computer program product 70 includes a computer readable medium having instructions which direct processor operation. Although the computer program product 70 is illustrated in FIG. 3 as a diskette by way of example only, a variety of communications media are suitable for use (e.g., network downloads, propagated signals, combinations thereof, and so on). Furthermore a variety of computer readable storage media are suitable for use (e.g. a set of CD-ROMs, tapes memory cards, memory sticks, combinations thereof, and so on).

As shown in FIG. 3, the controller 62 enables code execution at a kernel-level 72 and at a user-level 74 (separated by a dashed line in FIG. 3). A machine state server 76 runs at the kernel-level 74, and is configured to provide common generic objects which are representative of the data storage system 48 (FIG. 2). A user-level application 78 and libraries 80(A), 80(B), 80(C), . . . (collectively, libraries 80) operate at the user-level 74. As illustrated by the arrow 82, the user-level application 78 operates within the object oriented paradigm, and is capable of receiving sets 84 of common generic objects 86 from the kernel-level machine state server 76 in response to library calls to the machine state server 76. Each object 86 is capable of including a control byte, tag, length and data and thus operating as a CTLD in a conventional data storage system. Furthermore, each set 84 of common generic objects 86 (CGOs) takes the form of a binary tree which logically represents the state of the data storage system 48 where each object 86 (i.e., each CGO) is a node of the binary tree.

Changes to the data storage system 48 result in changes to the set 84 of common generic objects 86. For example, the addition of components (e.g., LUNs) to the data storage system 48 results in the addition of common generic objects 86 to the binary tree. Similarly, the removal of components from the data storage system 48 results in the removal of common generic objects 86 from the binary tree. Furthermore, changes to existing components (e.g., changes to data) results in updates/modifications to data of the common generic objects 86.

Once the user-level application 78 receives a set 84 of common generic objects 86 from the machine state server 76, the user-level application 78 is capable of generating a subsystem 88 of well-defined objects 90 from the set 84 of common generic objects 86. This traditional objectization process is illustrated by the arrow 92 in FIG. 3. The user-level application 78 (i.e., user-level application code running on a set of processors) is then capable of streaming the well-defined objects 90 of the subsystem 88 to the external hosts 44 (see FIG. 2) thus enabling the external hosts 44 with functionality with regard to the data storage system 48. As will now be explained with reference to FIGS. 4 and 5, the controller 62 is further capable of comparing sets 84 of common generic objects 86 in order to determine state changes of the data storage system 48.

Figure 4:
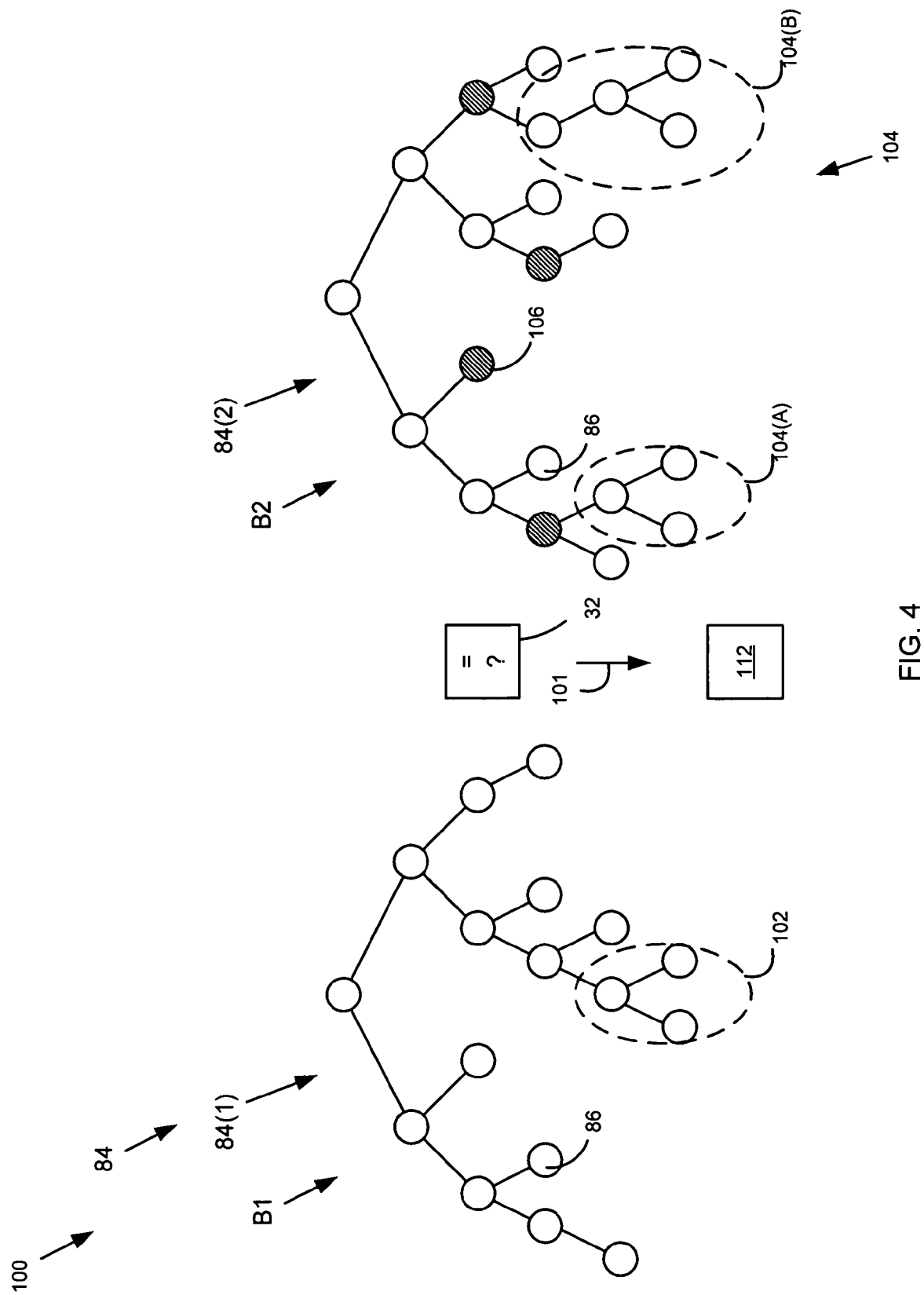
FIG. 4 is diagram illustrating a comparison between sets of common generic objects as performed by a user-level application of the controller of FIG. 3.
Figure 5:
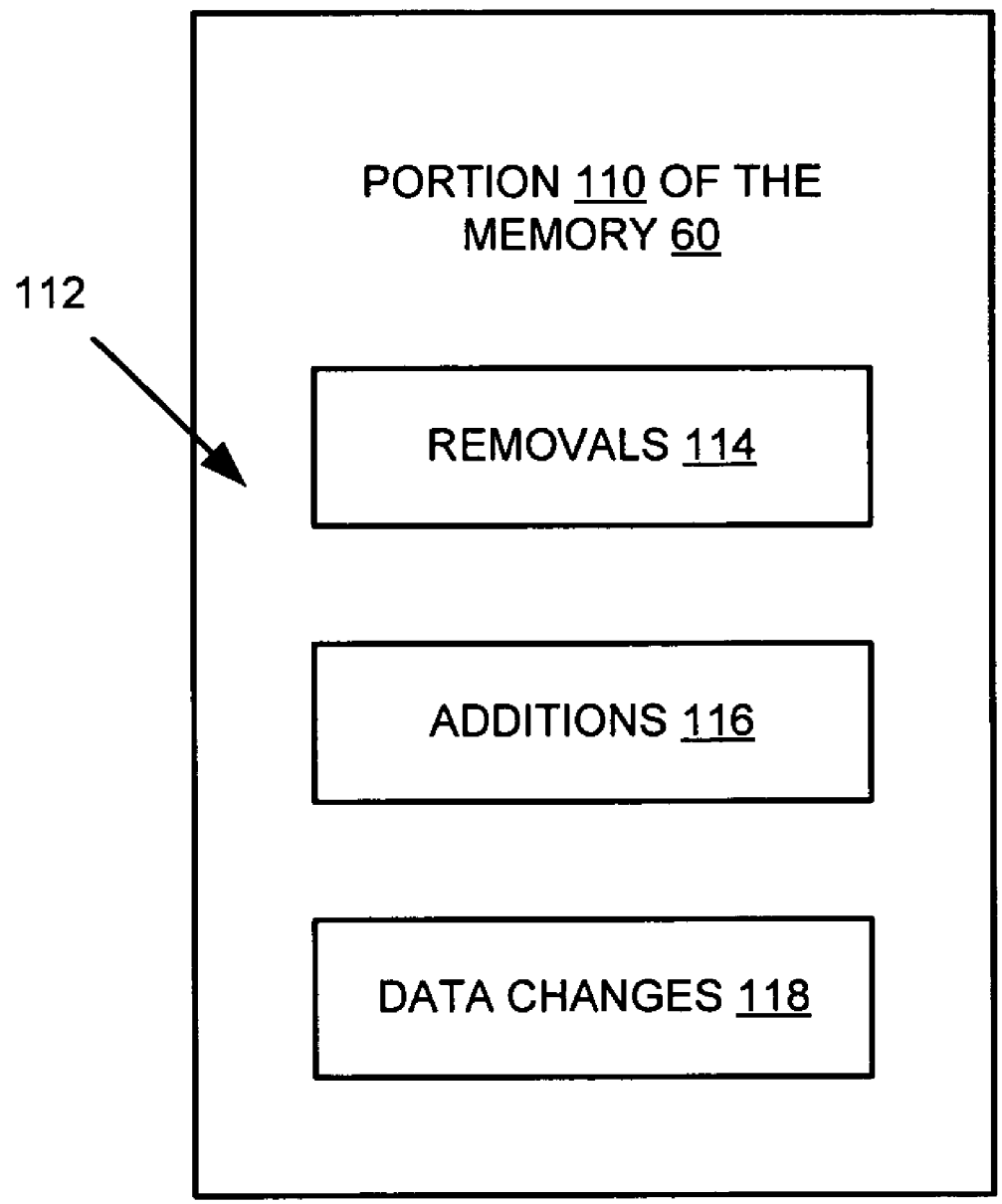
FIG. 5 is a block diagram of a portion of memory which is utilized by the user-level application of the controller of FIG. 3 when performing the comparison.

FIG. 4 is a diagram 100 of two sets 84 of common generic objects 86 which the user-level application 78 is capable of comparing in order to identify state changes which have occurred in the data storage system 48 (FIG. 2). FIG. 5 is a diagram of a portion 110 of the memory 60 of the state change management system 50 (FIG. 2) which is configured to store the results of the comparison.

As shown in FIG. 4, each set 84 of common generic objects 86 has the form of a binary tree and is a logical representation of the data storage system 48. Such a binary tree representation is well-known and is achievable in a variety of ways using the object oriented paradigm (e.g., recursively, iteratively, via pointers, etc.). Although the sets 84 are shown, by way of example, as including a relatively small number of common generic objects 86 (i.e., nodes of the binary trees), it should be understood that the state change management system 50 is capable of handling sets 84 which include a substantially large number of common generic objects 86 (e.g., hundreds of objects/nodes, thousands of objects/nodes, etc.).

Assume that the set 84(1) of common generic objects 86 (i) forms a first binary object tree B1 and (ii) is received by the user-level application 78 at a first time T1. Similarly, the set 84(2) of common generic objects 86 (i) forms a second binary object tree B2 and (ii) is received by the user-level application 78 at a second time T2 which is after T1. The user-level application 78 stores these sets 84(1), 84(2) in the memory 60 (FIG. 2) upon receipt from the kernel-level machine state server 76.

Once both sets 84(1), 84(2) are available, the user-level application 78 is configured to compare the sets 84(1), 84(2) to determine whether any changes have occurred in the data storage system 48. The user-level application 78 is then configured to store a set 112 of tree comparison results in the portion 110 of the memory 60 (FIG. 5) and is further configured to provide the set 112 of tree comparison results (see the arrow 101 in FIG. 4) which can be communicated to the external hosts 44 through the interface 58 upon request (also see FIG. 2).

At this point, it should be understood that the user-level application 78 is configured to perform the comparison in two stages. In the first stage, the user-level application 78 compares the structure of the binary trees B1, B2 and records structural differences between the binary trees B1, B2. In the second stage, the user-level application compares the object data within the binary trees B1, B2 and records data differences between the object data.

As shown in FIG. 4, the binary trees B1, B2 do not have the same structure. Recall that the user-level application 78 receives the binary tree B1 at time T1, and then receives the binary tree B2 at a later time T2. During the time T1 and T2, the data storage system 48 may have undergone state changes thus accounting for the differences in binary trees T1, T2 as shown in FIG. 4. Once the binary trees T1, T2 are received by the user-level application 78, the user-level application 78 is capable of determining whether the data storage system 48 has changed state between times T1 and T2.

Along these lines, it can be easily seen that the binary tree B2 differs from the binary tree B1 because the binary tree B2 is missing a sub-tree 102 that exists on the older the binary tree B1. Detection of the missing sub-tree 102 is easily performed by the user-level application 78 by comprehensively traversing binary trees B1, B2 (e.g., in a coordinated top-down, left-right manner). When the user-level application 78 detects the missing sub-tree 102 (i.e., during the first stage of binary tree analysis), the user-level application 78 removes the sub-tree 102 from the binary tree B1 and stores the sub-tree 102 in a "removals" area 114 in the portion 110 of the memory 60. Removal of the sub-tree 102 from the binary tree B1 makes the binary trees B1, B2 more closely resemble each other from a structural standpoint. Furthermore, placement of the removed sub-tree 102 in a "removals" area 114 in the portion 110 of the memory 60 enables the user-level application 78 to record identified changes in state of the data storage system 48 between times T1 and T2 (e.g., removed LUNs).

Additionally, it can be easily seen that the binary tree B2 further differs from the binary tree B1 because the binary tree B2 includes new sub-trees 104(A), 104(B) (collectively, new sub-trees 104). Such detection of the new sub-trees 104 is easily performed during the first stage while comprehensively traversing binary trees B1, B2 to also find any sub-tree removals as mentioned above. When the user-level application 78 detects the new sub-trees 104, the user-level application 78 removes the new sub-trees 104 from the binary tree B2 and stores the sub-trees 104 in an "additions" area 116 in the portion 110 of the memory 60. It should be understood that removal of the sub-trees 104 from the binary tree B2 again makes the binary trees B1, B2 more closely resemble each other from a structural standpoint. Moreover, placement of the removed sub-trees 104 in the "additions" area 116 of the portion 110 of the memory 60 enables the user-level application 78 to record other identified changes in state of the data storage system 48 between times T1 and T2 (e.g., added LUNs).

At this point, the user-level application 78 has modified the binary trees B1, B2 so that the binary trees B1, B2 now have the same structure. However, it can be easily seen that the binary tree B2 differs from the binary tree B1 because some of the objects 86 of the binary tree B2 contain new data as illustrated by the shaded nodes/objects 106 of the binary tree B2. Detection of the modified objects 106 is easily carried out by the user-level application 78 by comparing the corresponding objects pair-by-pair (e.g., by comparing data between pairs of corresponding objects 86). When the user-level application 78 detects an object 106 having different data (i.e., during the second stage of binary tree analysis), the user-level application 78 stores the object 106 (or alternatively the object 106 and any sub-tree beneath that object 106 for comprehensive state tracking) in a "changed objects" area 118 in the portion 110 of the memory 60. Placement of the changed object 106 in the "changed objects" area 118 of the portion 110 of the memory 60 enables the user-level application 78 to record identified changes in state of the data storage system 48 between times T1 and T2 (e.g., modified LUNs). Accordingly, a state change of the data storage system 48 results in a recorded difference that falls within one of three categories: (i) a removal of a sub-tree from a previous object tree, an addition of a sub-tree to a current object tree, and change to a node of a sub-tree of the current object tree.

It should be understood that it is not necessary to perform the above-described analysis on the actual sets 84 of common generic objects 86 which are received by the user-level application 78. Rather, the above-described analysis can be performed on copies of the actual sets 84. For example, the original set 84(B) can be maintained in an unmodified condition within the memory 60, and a copy of the original set 84(B) can be analyzed. As such, the original set 84(B) is then available for subsequent analysis. In particular, at a subsequent time T3 (i.e., a time after T2), the user-level application 78 is capable of receiving another set 84 of common generic objects 86 from the machine state server 76 and then comparing that other set 84 with the set 84(B) to determine whether the data storage system has changed state between times T2 and T3. Such a process is repeatable in an ongoing manner, e.g., at times T4, T5, and so on. Further details will now be provided with reference to FIG. 6.

Figure 6:
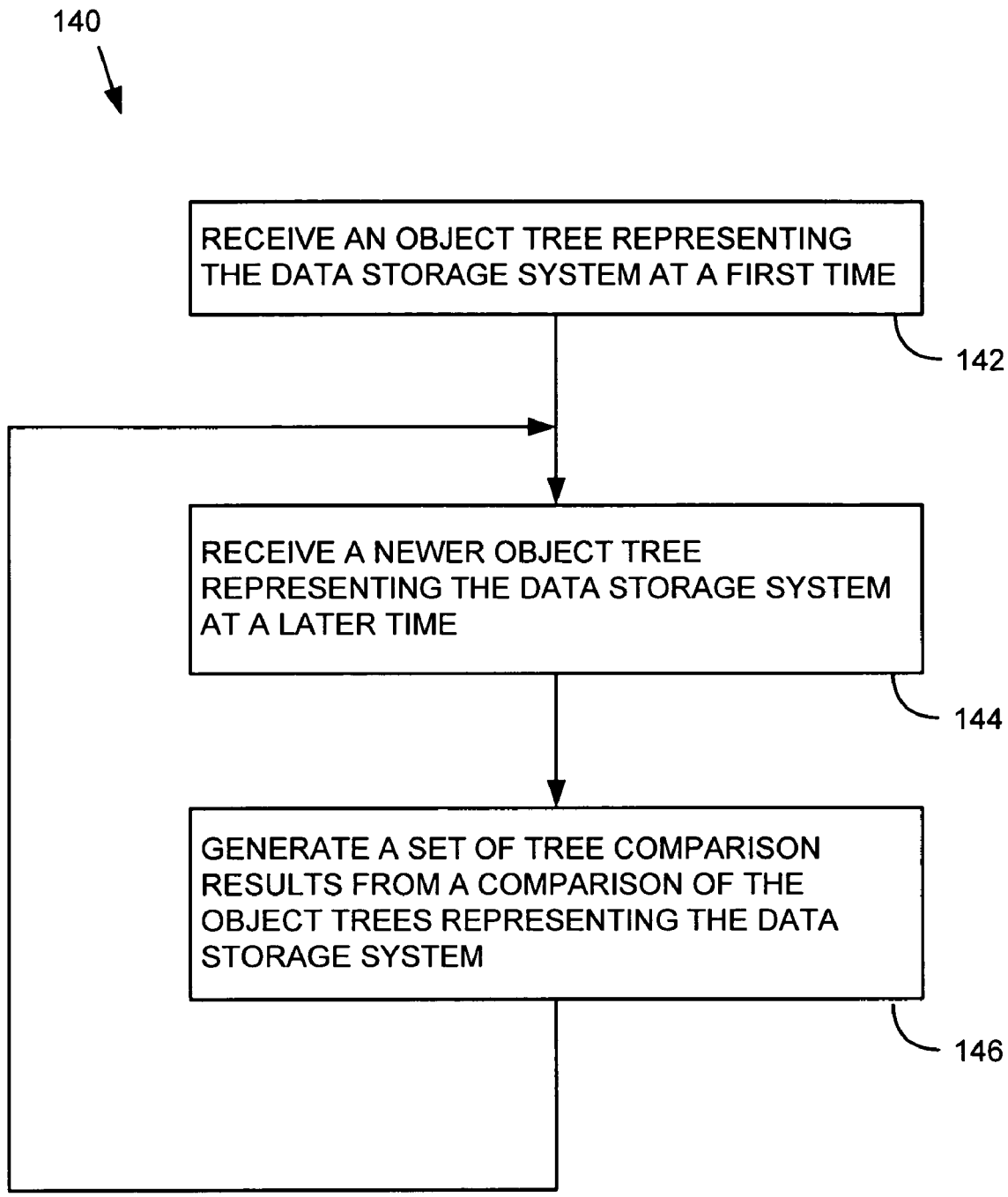
FIG. 6 is a flowchart of a procedure which is performed by the controller of FIG. 3.

FIG. 6 is a flowchart of a procedure 140 which is performed by the controller 62 of the state change management system 50 when managing state changes of the data storage system 48 (also see FIG. 2). In step 142, the user-level application 78 receives a first object tree which represents the data storage system 48 at a first time from the machine state server 76 (also see the binary tree T1 in FIG. 4).

In step 144, the user-level application 78 receives a second object tree which represents the data storage system at a second time from the machine state server 76 (also see the binary tree T2 in FIG. 4). At this point, the user-level application 78 is capable of determining whether any state changes have occurred in the data storage system 48 based on a comparison of the object trees.

In step 146, the user-level application 78 generates a set of tree comparison results from a comparison between the first object tree representing the data storage system at the first time and the second object tree representing the data storage system at the second time (also see the results 112 which are stored in the portion 110 of the memory 60 in FIG. 5). The set of tree comparison results 112 indicates whether state changes have occurred in the data storage system 48.

It should be understood that the machine state server 76 (FIG. 3) is configured to provide object trees to the user-level application 78 upon request and in an ongoing manner, e.g., in response to polling operations by the user-level application 78. Such operation enables the user-level application 78 to remain substantially up to date on state changes of the data storage system 48.

It should be further understood that the operation of the user-level application 78 does not require that the user-level application 78 objectize the sets 84 of common generic objects 86 into subsystems 88 of well-defined objects 90 since the sets 84 are compared directly with each other. As a result, the process of determining state changes based on comparing the sets 84 is less overhead intensive (i.e., no objectization is necessary). Furthermore, if there are no detected changes to the data storage system 48, there is no objectization needed whatsoever. On the other hand, if there are detected changes to the data storage system 48, only the changes to the set 84 need to be objectized.

Moreover, it should be appreciated that the well-defined objects 90 typically consume more memory than the binary object tree of common generic objects 86. Also, the processes of (i) objectizing the entire binary object tree and (ii) comparing the resulting well-defined objects 90 of each subsystem 88 take significant amounts of time (i.e., processor cycles). In contrast to a conventional approach which requires such processing, computerized resources are now free to perform other work.

Furthermore, the above-described process of comparing binary trees to detect data storage system state changes lends itself to certain optimizations. For example, once the binary trees B1 and B2 have been compared with each other, there is no need to store the older binary tree B1 in memory. Rather, only the newer binary tree B2 can be stored in memory for a subsequent comparison with yet another binary tree at a later time. Along these lines, as shown in FIG. 6, steps 144 and 146 of the procedure 140 can repeated to determine whether there have been any state changes to the data storage system 48 at a third time T3, at a fourth time T4, and so on. Such repeating of steps 144 and 146 are capable of being triggered by the user-level application 78 periodically (e.g., to poll for state changes on a regular basis) or in an event driven manner (e.g., in response to direct update requests from the external hosts 44).

As described above, an improved technique involves a comparison between object trees B1, B2 (e.g., memory constructs which are logically defined by sets 84 of common generic objects 86) to identify state changes in a data storage system 48. Such a technique alleviates the need to (i) objectize sets 84 of common generic objects 86 into subsystems 88 of well-defined objects 90 and then (ii) compare the subsystems 88 as in conventional approaches. Accordingly, such a technique does not require memory to store multiple subsystems 88 for comparison, and further does not require overhead to objectize the set 84 of common generic objects 86 and then compare resulting subsystems 88 each time it is needed to determine whether the data storage system 48 has undergone any changes in state.

While this invention has been particularly shown and described with references to preferred embodiments thereof, it will be understood by those skilled in the art that various changes in form and details may be made therein without departing from the spirit and scope of the invention as defined by the appended claims.

For example, it should be understood that the user-level application 78 was described above as determining state changes in the data storage system 48 (by comparing sets of common generic objects) in response to external host requests for illustration purposes only. In other arrangements, the user-level application 78 is capable of identifying state changes in the data storage system 48 in response to requests from other types of clients such as a user interface application (graphical or command line), a web server (for translating the objects into coherent form for a GUI), and the like. Such clients can run on a local or peer storage processor, run on an external device, etc.

What is claimed is:

1. In a computerized device configured to obtain object trees representing state information of a data storage system, a method of managing state changes of the data storage system, the method comprising:

receiving a first object tree which represents the data storage system at a first time;

receiving a second object tree which represents the data storage system at a second time, the second time being after the first time; and generating a set of tree comparison results from a comparison between the first object tree representing the data storage system at the first time and the second object tree representing the data storage system at the second time, the set of tree comparison results indicating whether state changes have occurred in the data storage system;

wherein:

receiving the first object tree which represents the data storage system at the first time includes receiving the first object tree, the first object tree including a first plurality of nodes logically connected in a first hierarchical manner, the first plurality of nodes representing an array of storage devices connected to the data storage system at the first time, the logical connections between the nodes of the first plurality of nodes representing a logical arrangement of the array of storage devices at the first time;

receiving the second object tree which represents the data storage system at the second time includes receiving the second object tree, the second object tree including a second plurality of nodes logically connected in a second hierarchical manner, the second plurality of nodes representing an array of storage devices connected to the data storage system at the second time, the logical connections between the nodes of the second plurality of nodes representing a logical arrangement of the array of storage devices at the second time;

the first object tree is a binary tree;

the second object tree is a binary tree;

a first node of the first plurality of nodes represents a first component of the array of storage devices;

a second node of the first plurality of nodes represents a second component of the array of storage devices, the first component being distinct from the second component;

a first node of the second plurality of nodes represents a third component of the array of storage devices;

a second node of the second plurality of nodes represents a fourth component of the array of storage devices, the third component being distinct from the fourth component;

the computerized device includes a kernel level machine state server and a user level object oriented application;

the kernel level machine state server is configured to provide object trees in response to polling operations by the user level object oriented application;

receiving the first object tree, receiving the second object tree, and generating the set of tree comparison results are carried out by the user level object oriented application;

the user level object oriented application is an agent running on the computerized device on behalf of external client hosts;

the data storage system is configured to store and retrieve data on behalf of the external client hosts;

the first object tree has nodes in a first tree form;

the second object tree has nodes in a second tree form; and generating the set of tree comparison results includes:
identifying additional portions in the second tree form based on a comparison of the first tree form with the second tree form,
identifying removed portions from the second tree form based on a comparison of the first tree form with the second tree form, and
identifying data modifications based on a comparison of node data of the nodes of the first and second object trees.

2. The method of claim 1 wherein identifying the additional portions in the second tree form includes:
finding any sub-trees which are present in the second tree form but which do not exist in the first tree form.

3. The method of claim 1 wherein identifying the removed portions in the second tree form includes:
finding any sub-trees which do not exist in the second tree form but which are present in the first tree form.

4. The method of claim 1 wherein identifying data differences includes:
finding differences in the node data of the nodes of the first and second object trees.

5. The method of claim 1 wherein each node is a common generic object; and wherein the method further comprises:
generating a new set of well-defined objects when at least one of additional portions in the second tree form have been identified, removed portions from the second tree form have been identified, and data modifications have been identified, and
refraining from generating the new set of well-defined objects when no additional portions in the second tree form have been identified, no removed portions from the second tree form have been identified, and no data modifications have been identified.

6. The method of claim 1, further comprising:
after generating the set of tree comparison results, saving the second object tree in memory and deleting the first object tree from memory.

7. The method of claim 6, further comprising:
receiving a third object tree which represents the data storage system at a third time, the third time being after the second time; and
generating another set of tree comparison results from a comparison between the second object tree representing the data storage system at the
second time and the third object tree representing the data storage system at the third time.

8. The method of claim 7 wherein receiving the third object tree and generating the other set of tree comparison results are performed in response to a timer configured to periodically poll for state changes of the data storage system.

9. The method of claim 7 wherein receiving the third object tree and generating the other set of tree comparison results are performed in response to a request from an external host of the data storage system thus providing a current state of the data storage system to the external host in an event driven manner.

10. A computerized device to manage state changes of a data storage system, the computerized device comprising:
an interface;
memory; and
a controller coupled to the interface and the memory, the controller being configured to:
receive a first object tree which represents the data storage system at a first time,
receive a second object tree which represents the data storage system at a second time, the second time being after the first time, and
generate a set of tree comparison results from a comparison between the first object tree representing the data storage system at the first time and the second object tree representing the data storage system at the second time, the set of tree comparison results indicating whether state changes have occurred in the data storage system, the set of tree comparison results being stored in the memory and being externally accessible through the interface;
wherein:
the first object tree includes a first plurality of nodes logically connected in a first hierarchical manner, the first plurality of nodes representing an array of storage devices connected to the data storage system at the first time, the logical connections between the nodes of the first plurality of nodes representing a logical arrangement of the array of storage devices at the first time;
the second object tree includes a second plurality of nodes logically connected in a second hierarchical manner, the second plurality of nodes representing an array of storage devices connected to the data storage system at the second time, the logical connections between the nodes of the second plurality of nodes representing a logical arrangement of the array of storage devices at the second time;
the first object tree is a binary tree;
the second object tree is a binary tree;
a first node of the first plurality of nodes corresponds to a first component of the array of storage devices;
a second node of the first plurality of nodes corresponds to a second component of the array of storage devices, the first component being distinct from the second component;
a first node of the second plurality of nodes corresponds to a third component of the array of storage devices;

a second node of the second plurality of nodes corresponds to a fourth component of the array of storage devices, the third component being distinct from the fourth component;

the computerized device further comprises a kernel level machine state server;

the controller includes a user level object oriented application;

the kernel level machine state server is configured to provide object trees in response to polling operations by the user level object oriented application;

receiving the first object tree, receiving the second object tree, and generating the set of tree comparison results are carried out by the user level object oriented application;

the user level object oriented application is an agent running on the computerized device on behalf of external client hosts;

wherein the data storage system is configured to store and retrieve data on behalf of the external client hosts;

the first object tree has nodes in a first tree form;

the second object tree has nodes in a second tree form; and the controller, when generating the set of tree comparison results, is configured to:

identify additional portions in the second tree form based on a comparison of the first tree form with the second tree form;

identify removed portions from the second tree form based on a comparison of the first tree form with the second tree form; and identify data modifications based on a comparison of node data of the nodes of the first and second object trees.

11. The computerized device of claim 10 wherein each node is a common generic object; and wherein the controller is further configured to:

generate a new set of well-defined objects when at least one of additional portions in the second tree form have been identified, removed portions from the second tree form have been identified, and data modifications have been identified, and refrain from generating the new set of well-defined objects when no additional portions in the second tree form have been identified, no removed portions from the second tree form have been identified, and no data modifications have been identified.

12. The computerized device of claim 10 wherein the first object tree initially resides in the memory; and wherein the controller is further configured to:

after generating the set of tree comparison results, save the second object tree in the memory and delete the first object tree from the memory.

13. The computerized device of claim 12 wherein the controller is further configured to:

receive a third object tree which represents the data storage system at a third time, the third time being after the second time; and generate another set of tree comparison results from a comparison between the second object tree representing the data storage system at the second time and the third object tree representing the data storage system at the third time.

14. A computer program product that includes a computer readable storage medium having instructions stored thereon for managing state changes of a data storage system, such that the instructions, when carried out by a computerized device, cause the computerized device to:

receive a first object tree which represents the data storage system at a first time;

receive a second object tree which represents the data storage system at a second time, the second time being after the first time; and generate a set of tree comparison results from a comparison between the first object tree representing the data storage system at the first time and the second object tree representing the data storage system at the second time, the set of tree comparison results indicating whether state changes have occurred in the data storage system;

wherein:

receiving the first object tree which represents the data storage system at the first time includes receiving the first object tree, the first object tree including a first plurality of nodes logically connected in a first hierarchical manner, the first plurality of nodes representing an array of storage devices connected to the data storage system at the first time, the logical connections between the nodes of the first plurality of nodes representing a logical arrangement of the array of storage devices at the first time;

receiving the second object tree which represents the data storage system at the second time includes receiving the second object tree, the second object tree including a second plurality of nodes logically connected in a second hierarchical manner, the second plurality of nodes representing an array of storage devices connected to the data storage system at the second time, the logical connections between the nodes of the second plurality of nodes representing a logical arrangement of the array of storage devices at the second time;

the first object tree is a binary tree;

the second object tree is a binary tree;

a first node of the first plurality of nodes represents a first component of the array of storage devices;

a second node of the first plurality of nodes represents a second component of the array of storage devices, the first component being distinct from the second component;

a first node of the second plurality of nodes represents a third component of the array of storage devices;

a second node of the second plurality of nodes represents a fourth component of the array of storage devices, the third component being distinct from the fourth component;

the computerized device includes a kernel level machine state server and a user level object oriented application;

the kernel level machine state server is configured to provide object trees in response to polling operations by the user level object oriented application;

receiving the first object tree, receiving the second object tree, and generating the set of tree comparison results are carried out by the user level object oriented application;

the user level object oriented application is an agent running on the computerized device on behalf of external client hosts;

the data storage system is configured to store and retrieve data on behalf of the external client hosts;

the first object tree has nodes in a first tree form;

the second object tree has nodes in a second tree form; and the instructions, when carried out by the computerized device, cause the computerized device to, when generating the set of tree comparison results:

identify additional portions in the second tree form based on a comparison of the first tree form with the second tree form;
identify removed portions from the second tree form based on a comparison of the first tree form with the second tree form; and
identify data modifications based on a comparison of node data of the nodes of the first and second object trees.

15. The method of claim 1 wherein generating the set of tree comparison results includes:
traversing the first object tree and the second object tree on a node-by-node basis;
for each node of the first binary tree traversed, determining if a node is present at a corresponding location in the second binary tree, and if not, determining that storage devices corresponding to that node and all of its descendants have been removed from the data storage system between the first time and the second time;
for each node of the second binary tree traversed, determining if a node is present at a corresponding location in the first binary tree, and if not, determining that storage devices corresponding to that node and all of its descendants have been added to the data storage system between the first time and the second time;
for each node traversed which is present in corresponding locations in the first binary tree and the second binary tree, comparing that node of the first binary tree to the corresponding node of the second binary tree, and if data contained within the node of the first binary tree differs from data contained within the node of the second binary tree, then determining that storage devices corresponding to that node and all of its descendants have been changed between the first time and the second time.

16. The method of claim 15 wherein:
the method further comprises making a copy of the second binary tree;
traversing the second object tree on a node-by-node basis includes traversing the copy of the second binary tree;
the method further comprises:
for each node of the first binary tree traversed, if no node is present at the corresponding location in the second binary tree, then removing that node and all of its descendants from the first binary tree and storing that node and all of its descendants in a location specified for removed objects;
for each node of the copy of the second binary tree traversed, if no node is present at the corresponding location in the first binary tree, then removing that node and all of its descendants from the copy of the second binary tree and storing that node and all of its descendants in a location specified for added objects.

17. The method of claim 1 wherein generating the set of tree comparison results from the comparison between the first object tree and the second object tree includes:
directly comparing a plurality of nodes of the first object tree to a corresponding plurality of nodes of the second object tree without creating any intermediate structure based on the first object tree and without creating any intermediate structure based on the second object tree.

18. The computerized device of claim 10 wherein the controller, when generating the set of tree comparison results from the comparison between the first object tree and the second object tree is configured to:
directly compare a plurality of nodes of the first object tree to a corresponding plurality of nodes of the second object tree without creating any intermediate structure based on the first object tree and without creating any intermediate structure based on the second object tree.

19. The method of claim 1 wherein:
the first component is an area of physical data storage identified by a first logical unit number (LUN);
the second component is an area of physical data storage identified by a second LUN, the first LUN being distinct from the second LUN;
the third component is an area of physical data storage identified by a third LUN; and
the fourth component is an area of physical data storage identified by a fourth LUN, the third LUN being distinct from the fourth LUN.

20. The computerized device of claim 10 wherein:
the first component is an area of physical data storage identified by a first logical unit number (LUN);
the second component is an area of physical data storage identified by a second LUN, the first LUN being distinct from the second LUN;
the third component is an area of physical data storage identified by a third LUN; and
the fourth component is an area of physical data storage identified by a fourth LUN, the third LUN being distinct from the fourth LUN.

21. The computer program product of claim 14 wherein:
the first component is an area of physical data storage identified by a first logical unit number (LUN);
the second component is an area of physical data storage identified by a second LUN, the first LUN being distinct from the second LUN;
the third component is an area of physical data storage identified by a third LUN; and
the fourth component is an area of physical data storage identified by a fourth LUN, the third LUN being distinct from the fourth LUN.

* * * * *